July 31, 1962 A. D. HAY 3,047,211
VENTILATING APPARATUS
Filed April 16, 1959 2 Sheets-Sheet 1
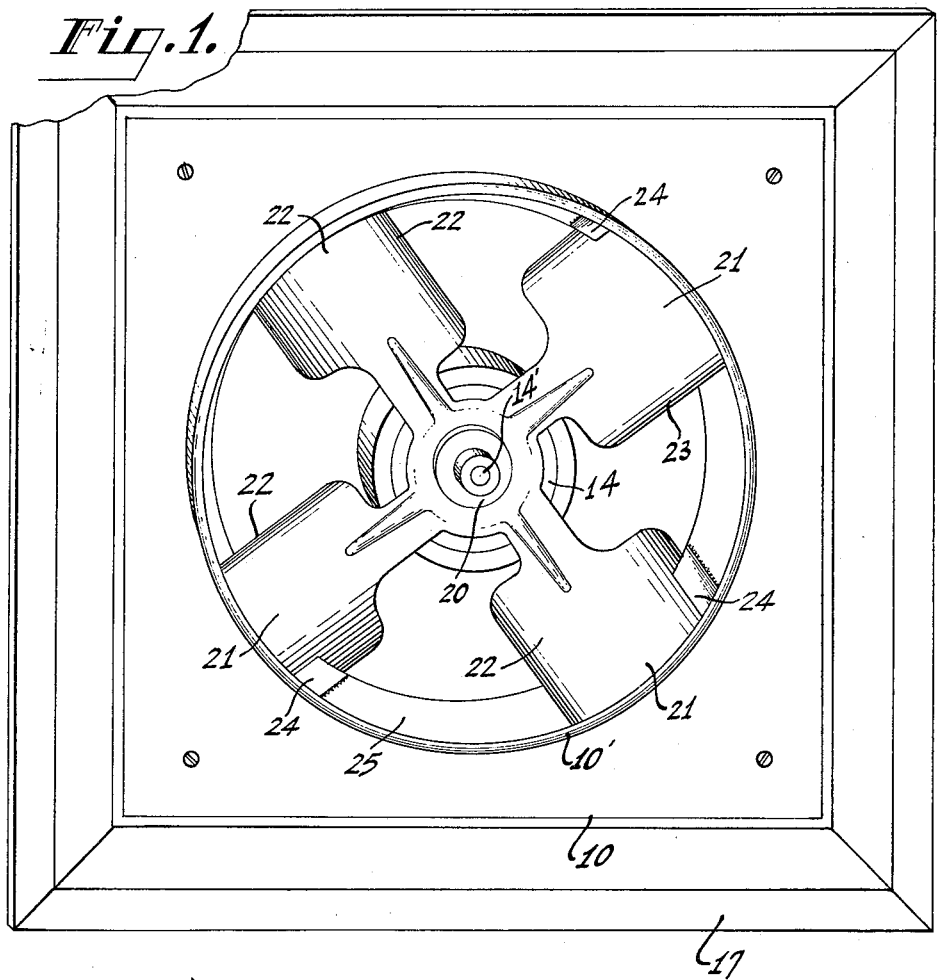
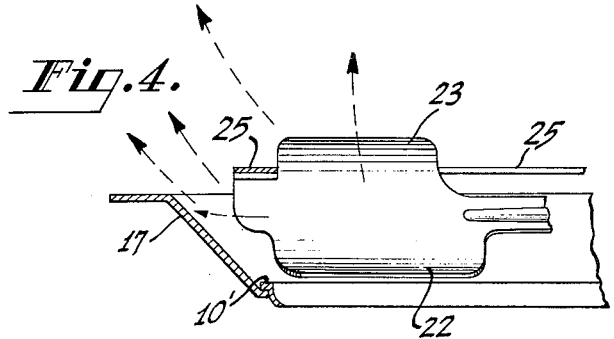
INVENTOR.
ARTHUR DONALD HAY
BY
William A. Zalesak
ATTORNEY INVENTOR.
ARTHUR DONALD HAY
BY
William A. Zalesak
ATTORNEY

United States Patent Office 3,047,211
Patented July 31, 1962

---

3,047,211
VENTILATING APPARATUS
Arthur Donald Hay, Princeton, N.J., assignor to McLean Engineering Laboratories
Filed Apr. 16, 1959, Ser. No. 806,905
12 Claims. (Cl. 230—119)

My invention relates to fan assemblies, more particularly to fan assemblies capable of producing mixed flow, that is, to apparatus for turning the air stream between radial and axial directions at different angles while the air passes through the apparatus.

In some applications it is desirable to have the air flow other than only in an axial or radial direction. Complicated structures have been devised to cause air to flow radially of the fan structure. However, so far as I am aware, no simple structure has been devised for causing air to flow in directions at angles between the axial and radial directions, or of apparatus capable of mixing radial and axial flows to produce a flow of air at other than axial or radial directions. Nor am I aware of any structure which can be simply modified to obtain flow at different angular paths.

It is therefore an object of my invention to provide an improved fan assembly of simple design capable of providing a flow of air in any desired direction between axial and radial flow.

It is a further object of my invention to provide apparatus of the above described kind which can be readily modified to change the angle of flow.

In accordance with my invention, I provide an orifice plate upon which is resiliently supported a fan assembly including a resiliently mounted motor rotatably supporting a fan. The fan blades have a reasonably steep pitch with the tip of the leading edge of all blades in substantially the same plane. At or near the trailing edge of the tips of the blades and at the outer periphery, I attach a thin ring lying in a plane transverse to the axis of rotation of the fan. The width of the ring is approximately the dimension by which the blades overhang the orifice of the orifice plate. The result of this construction is that while some of the air is initially directed radially and while the rest is directed axially, the resultant flow is at an angle to both of these directions, the angle being determined by the width and position of the ring as well as the overhang of the blades.

Referring to the drawings, in which:

FIG. 1 is a front perspective of a fan assembly incorporating my invention;

FIG. 4 is a partial section showing details of construction and the air flow direction.

Figure 2:
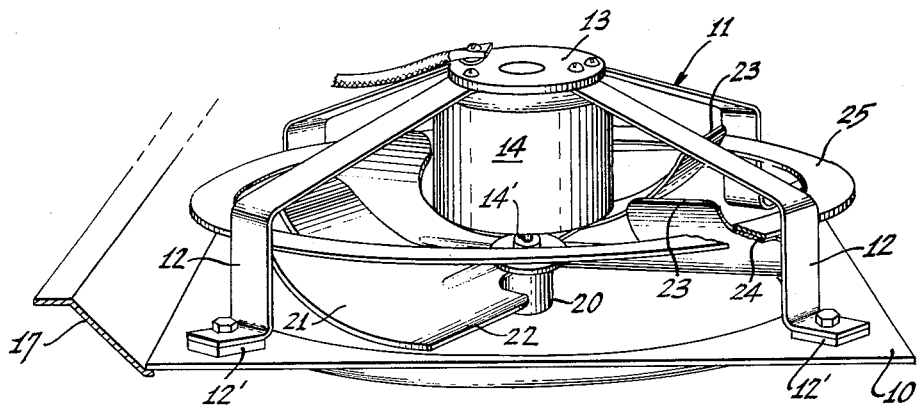
FIG. 2 is a perspective of the other side of the fan assembly shown in FIG. 1 with part of the housing removed.
Figure 3:
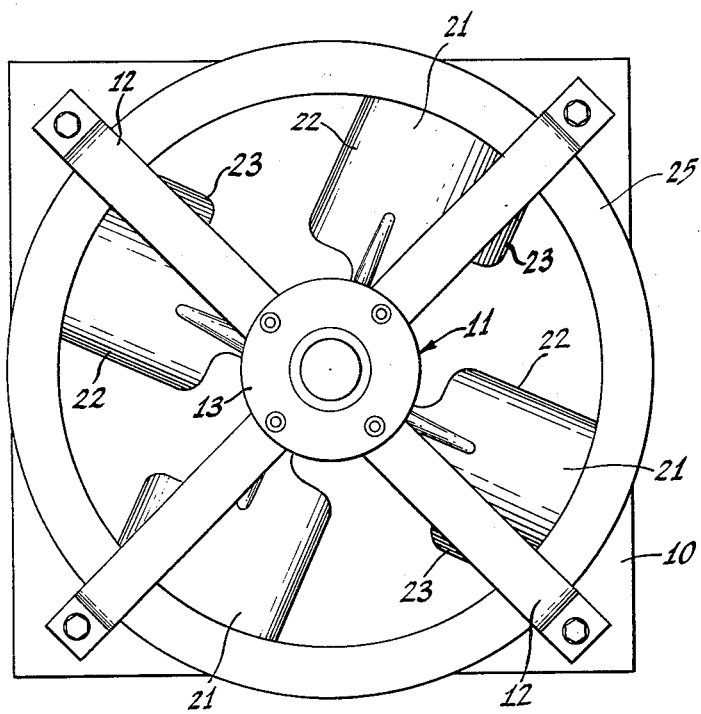
FIG. 3 is a rear view of FIG. 1 with part of the housing removed.

In accordance with my invention I provide an orifice plate 10 having a rounded entrance or throat 10'. Mounted on the back of the plate 10 is a supporting structure 11 which may be a spider frame having legs 12 and a supporting ring 13 resiliently mounted on pads or shock mounts 12'. This supporting structure is mounted in a housing 17.

The fan and motor assembly includes the motor 14 supported on the supporting ring 13. The fan hub 20 is secured to the shaft 14' of the motor 14.

In accordance with my invention I fix a plurality of blades 21 to hub 20. Each blade 21 is provided with a tip 22 and has a reasonably steep pitch from the tips of the leading edges which all lie in substantially the same plane to the trailing edges 23.

In accordance with my invention adjacent the outer end of the trailing edge of each blade, I provide a cut back 24 which is folded back to lie in a plane transverse to the axis of rotation of the fan, all of said folded back portions lying in a common plane. Secured to these folded back sections or portions I secure a ring 25.

The fan assembly on the plate 10 is mounted on a housing 17 as best shown in FIGURES 1 and 2. The housing helps direct the air as shown in FIGURE 4, the flow at the corners traveling longer radial paths.

As the fan rotates, air flow occurs simultaneously in radial and axial directions as indicated by the arrows, radially between the fan and orifice plate 10, and axially of the fan causing a resultant flow as shown by the dotted line arrow.

The direction of flow can be varied by changing the width of the ring 25 and by its location at the outer periphery of the blades or intermediate the outer periphery and the hub.

A further advantage of my invention is that the input horsepower remains approximately constant as the static issuance varies, and it is possible to obtain higher static pressure than for a comparable propeller type fan without the ring and a small orifice. This is so because with a centrifugal fan, if flow is restricted, an increased back pressure results causing the fan to speed up and the required input horsepower drops off. With a propeller fan, restricted flow requires more horsepower due to increased turbulence. With the balancing effect of a fan made according to my invention, the horsepower requirements tend to remain the same.

What is claimed is:

1. A fan assembly for producing a mixed flow of output air including a fan having a plurality of blades, said blades having a comparatively steep pitch and having leading edges lying in substantially the same plane, said blades each having a split trailing edge the outer portion of each of said trailing edges being formed to extend rearwardly of said trailing edge and to lie in a plane transverse of the axis of rotation of said fan, and a flat ring-like member secured to and overlying the outer portions.

2. A fan assembly for producing a mixed flow of output air including a fan having a plurality of blades, said blades having leading edges lying in substantially the same plane, said blades each having a split trailing edge the outer portion of said trailing edges being formed to extend rearwardly of said trailing edge and to lie in a plane transverse of the axis of rotation of said fan, a flat ring-like member secured to and overlying said outer portions and having a width substantially the width of said outer portions.

3. A fan assembly for producing a mixed flow of output air including an orifice plate having a circular opening, a fan having a plurality of blades, said blades having a comparatively steep pitch and having leading edges lying in substantially the same plane, each of said blades overlapping said opening and having a split trailing edge the outer portion of said trailing edge being formed to extend rearwardly of said trailing edge and to lie in a plane transverse of the axis of rotation of said fan, a flat ring-like member secured to the outer portions of said blades and having a width substantially the width of said outer portions, said ring being substantially coextensive with the overlapping portions of said blades.

4. A fan assembly for producing a mixed flow of output air including an orifice plate having a circular opening, a fan having a plurality of blades, said blades having a comparatively steep pitch and having leading edges lying in substantially the same plane, each of said blades overlapping said opening and having a split trailing edge the outer portion of said trailing edge being formed to extend rearwardly of said trailing edge and to lie in a plane transverse of the axis of rotation of said fan, a flat-ring-like member secured to and overlying the outer portions of said blades and having a width substantially the width of said outer portions.

5. A fan assembly for producing a mixed flow of output air including an orifice plate having a circular opening, a fan having a plurality of blades, said blades having a comparatively steep pitch and having leading edges lying in substantially the same plane, each of said blades overlapping said opening and having a split trailing edge the outer portion of said trailing edge being formed to extend rearwardly of said trailing edge and to lie in a plane transverse of the axis of rotation of said fan, a flat ring-like member secured to the outer portions of said blades and having a width substantially the width of said outer portions, and a housing having outwardly tapered sides, said plate and said fan being received within said housing whereby radially directed air flows against the tapered sides of said housing.

6. A fan assembly for producing a mixed flow of output air including a fan having a plurality of blades, said blades being pitched and having leading edges lying in substantially the same plane, said blades each having a split trailing edge the outer portion of said trailing edge being formed to extend rearwardly of said trailing edge and to lie in a plane transverse of the axis of rotation of said fan, a flat-ring-like member secured to and overlying the outer portions of said blades and having a width substantially the width of said outer portions.

7. A fan assembly for producing a mixed flow of output air including a fan having a plurality of blades, said blades having a comparatively steep pitch and having leading edges lying in substantially the same plane, the trailing edges of each blade including a steeply pitched portion and an outer portion extending rearwardly of said trailing edge and lying in a plane normal to the axis of rotation of said fan, and a ring-like member having a width equal to the width of the portion lying in said plane attached to the portion of said blades lying in said normal plane.

8. A fan assembly for producing a mixed flow of output air including an orifice plate having a circular opening, a fan having a plurality of blades, said blades being pitched and having leading edges lying in substantially the same plane, said blades each having a split trailing edge the outer portion of said trailing edge being formed to extend rearwardly of said trailing edge and to lie in a plane transverse of the axis of rotation of said fan, the outer portions of said blades overlapping the opening in said orifice plate, a flat ring-like member secured to said outer portion and having the width substantially the width of said outer portions.

9. A fan assembly for producing a mixed output flow of air having axial, radial and intermediate components, including a fan having a plurality of blades extending radially from a central hub, said blades having a comparatively steep pitch and having leading edges lying substantially in the same plane, said blades each having a split trailing edge, the outer portion of each of said trailing edges being formed to lie in a second plane transverse to the axis of rotation of said fan and to extend rearwardly of said trailing edges, a flat ring-like member secured to and overlying the outer portions of said blades, the trailing edges of the inner portions of said blades lying in a third plane, said planes being parallel, said second plane lying intermediate the plane of said leading edges and said third plane.

10. A fan assembly for producing a mixed output flow of air including a fan having a plurality of blades extending radially from a central hub, said blades having a comparatively steep pitch and having leading edges lying substantially in the same plane, said blades each having a split trailing edge, the outer portion of each of said trailing edges being formed to lie in a second plane transverse to the axis of rotation of said fan and to extend rearwardly of said trailing edges, a flat ring-like member secured to and overlying the outer portions of said blades, the trailing edges of the inner portions of said blade lying in a third plane, said planes being parallel, said second plane lying intermediate the plane of said leading edges and said third plane, an orifice plate having a circular opening, said fan assembly being supported on said plate and coaxial with said opening, said plate having sides at an angle to the axis of rotation of said fan and against which radial flow from said fan is directed for causing mixing.

11. A fan assembly for producing a mixed output flow of air having axial, radial and intermediate components, including a fan having a plurality of blades extending radially from a central hub, said blades having a curved transverse section and having leading edges lying substantially in the same plane, said blades each having a split trailing edge, the outer portion of each of said trailing edges being formed to lie in a second plane transverse to the axis of rotation of said fan and to extend rearwardly of said trailing edges, a flat ring-like member secured to and overlying the outer portions of said blades and having a width substantially the width of said outer portions, the inner portions of said trailing edges lying in a third plane, said planes being parallel, the plane of said trailing edges lying intermediate the plane of said leading edges and said third plane.

12. A fan assembly for producing a mixed output flow of air including a fan having a plurality of blades extending radially from a central hub and having substantially the same width throughout their length, said blades having curved transverse sections and having leading edges lying substantially in the same plane, said blades each having a split trailing edge, the outer portion of each of said trailing edges being formed to lie in a second plane transverse to the axis of rotation of said fan and to extend rearwardly of said trailing edges, a flat ring-like member secured to and overlying the outer portions of said blades and having a width substantially the width of said outer portions, the inner portions of said trailing edges lying in a third plane, said planes being parallel, the plane of said trailing edges lying intermediate the plane of said leading edges and said third plane, an orifice plate having a circular opening, said fan assembly being supported on said plate and coaxial with said opening, said plate having outwardly tapering sides against which radial flow from said fan is directed.

References Cited in the file of this patent

UNITED STATES PATENTS

| 2,301,857 | Criqui | Nov. 10, 1942 |
| 2,495,855 | Marcoe | Jan. 31, 1950 |
| 2,852,181 | Kline et al. | Sept. 16, 1958 |
| 2,910,224 | Campbell | Oct. 27, 1959 |
| 2,958,459 | Newton et al. | Nov. 1, 1960 |

FOREIGN PATENTS

| 2,433 of 1907 | Great Britain | Jan. 30, 1908 |
| 16,592 of 1908 | Great Britain | Aug. 5, 1909 |